United States Patent
Holley et al.

(10) Patent No.: US 10,436,110 B2
(45) Date of Patent: Oct. 8, 2019

(54) ROTATING DETONATION ENGINE UPSTREAM WAVE ARRESTOR

(71) Applicant: UNITED TECHNOLOGIES CORPORATION, Farmington, CT (US)

(72) Inventors: Adam Takashi Holley, Manchester, CT (US); Peter A T Cocks, East Hartford, CT (US); Christopher Britton Greene, East Hartford, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 124 days.

(21) Appl. No.: 15/470,783

(22) Filed: Mar. 27, 2017

(65) Prior Publication Data

US 2018/0274442 A1    Sep. 27, 2018

(51) Int. Cl.
| | |
|---|---|
| *F02C 7/00* | (2006.01) |
| *F42B 3/08* | (2006.01) |
| *F02C 5/04* | (2006.01) |
| *F02C 5/12* | (2006.01) |
| *F42B 1/02* | (2006.01) |

(52) U.S. Cl.
CPC ............... *F02C 7/00* (2013.01); *F02C 5/04* (2013.01); *F02C 5/12* (2013.01); *F42B 3/08* (2013.01); *F42B 1/02* (2013.01)

(58) Field of Classification Search
CPC ...... F02C 7/00; F02C 5/04; F23R 7/00; F23C 15/00
USPC ........................................................ 244/53 R
See application file for complete search history.

(56) References Cited

U.S. PATENT DOCUMENTS

| | | | |
|---|---|---|---|
| 2,480,626 | A | 8/1949 | Bodine, Jr. |
| 3,423,942 | A | 1/1969 | Spindler |
| 5,345,758 | A | 9/1994 | Bussing |
| 5,473,885 | A | 12/1995 | Hunter, Jr. et al. |
| 5,579,633 | A | 12/1996 | Hunter, Jr. |
| 6,293,235 | B1 | 9/2001 | Cobb, Jr. |
| 6,460,494 | B1 | 10/2002 | Cobb, Jr. |
| 6,883,543 | B2 | 4/2005 | Tew et al. |
| 7,739,867 | B2 | 6/2010 | Kenyon et al. |
| 8,544,280 | B2 | 10/2013 | Lu et al. |

(Continued)

FOREIGN PATENT DOCUMENTS

| | | |
|---|---|---|
| CN | 103423031 | 12/2013 |
| DE | 102013216398 | 2/2015 |

(Continued)

OTHER PUBLICATIONS

Holley et al., U.S. Appl. No. 15/470,770, filed Mar. 27, 2017 and entitled Rotating Detonation Engine Multi-Stage Mixer.

(Continued)

*Primary Examiner* — J. Woodrow Eldred
(74) *Attorney, Agent, or Firm* — Snell & Wilmer LLP (57) ABSTRACT

A rotating detonation engine includes an annulus that defines a volume in which a mixture of an oxidizer and a fuel detonate in a rotating fashion, the volume defining a downstream outlet through which detonation exhaust flows. The rotating detonation engine further includes a wave arrestor positioned upstream from a location of detonation and configured to reduce a magnitude of a pressure wave traveling upstream from the location of detonation.

20 Claims, 9 Drawing Sheets

(56) References Cited

U.S. PATENT DOCUMENTS

| | | |
|---|---|---|
| 8,650,856 B2 | 2/2014 | Brumberg et al. |
| 8,683,780 B2 | 4/2014 | Shimo et al. |
| 8,707,674 B2 | 4/2014 | Moscinski et al. |
| 8,893,467 B2 | 11/2014 | Nalim et al. |
| 9,021,783 B2 | 5/2015 | Hill et al. |
| 9,046,058 B2 | 6/2015 | Claflin |
| 9,512,805 B2 | 12/2016 | Snyder |
| 9,556,794 B2 | 1/2017 | Falempin et al. |
| 9,732,670 B2 * | 8/2017 | Joshi .................. F23R 7/00 |
| 2002/0068250 A1 | 6/2002 | Nalim |
| 2005/0079461 A1 | 4/2005 | Kasahara |
| 2005/0112516 A1 | 5/2005 | Aarnio |
| 2006/0260291 A1 | 11/2006 | Vandervort |
| 2009/0139203 A1 | 6/2009 | Rasheed |
| 2011/0005195 A1 * | 1/2011 | Mungas ............ F02K 9/566 60/257 |
| 2012/0227411 A1 | 9/2012 | Carroni |
| 2013/0025256 A1 | 1/2013 | Lu et al. |
| 2014/0182295 A1 | 7/2014 | Falempin |
| 2014/0260294 A1 | 9/2014 | Farshchian |
| 2015/0167544 A1 | 6/2015 | Joshi |
| 2015/0300630 A1 | 10/2015 | Juan |
| 2015/0308348 A1 | 10/2015 | Minick |
| 2018/0080412 A1 | 3/2018 | Mizener |
| 2018/0180289 A1 | 6/2018 | Lavertu, Jr. |

FOREIGN PATENT DOCUMENTS

| | | |
|---|---|---|
| EP | 2261559 | 12/2010 |
| RU | 2585328 | 8/2015 |

OTHER PUBLICATIONS

Greene et al., U.S. Appl. No. 15/470,796, filed Mar. 27, 2017 and entitled Rotating Detonation Engine Combustor Wave Reflector.

Greene et al., U.S. Appl. No. 15/470,800, filed Mar. 27, 2017 and entitled Rotating Detonation Engine wave induced mixer.

Rankin, Brent A. et al; "*Imaging of OH\* Chemiluminescence in an Optically Accessible Nonpremixed Rotating Detonation Engine*"; 53$^{rd}$ American Institute of Aeronautics and Astronautics Aerospace Sciences Meeting, Jan. 2015; 16 pages.

USPTO, Pre-Interview First Office Action dated Jun. 19, 2019 in U.S. Appl. No. 15/470,770.

USPTO, Restriction/Election Requirement dated Jun. 19, 2019 in U.S. Appl. No. 15/470,796.

\* cited by examiner

ROTATING DETONATION ENGINE UPSTREAM WAVE ARRESTOR

GOVERNMENT LICENSE RIGHTS

This disclosure was made with government support under contract N68936-15-C-0012 and awarded by the United States Defense Advanced Research Projects Agency. The government has certain rights in the disclosure.

FIELD

The present disclosure is directed to rotating detonation engines and, more particularly, to wave arrestors for reducing upstream impact of pressure waves generated by detonations within a rotating detonation engine.

BACKGROUND

Gas turbine engines include a compressor section, a turbine section, and a combustor section. The compressor section receives air from the environment and uses various rotors and stators to compress the air. The combustor section receives the compressed air and fuel, mixes the compressed air and fuel, and combusts the mixture to generate thrust. Exhaust from the combustor section is received by the turbine section which converts the exhaust into torque, a portion of which may be transferred to the compressor section. Recently, there has been research on the use of rotating detonation engines as combustors for gas turbine engines and other direct thrust applications such as ramjet and augmentor combustors. Due to the presence of detonations, high magnitude pressure waves are generated and may undesirably propagate upstream from a location of the detonation.

SUMMARY

Disclosed herein is a rotating detonation engine. The rotating detonation engine includes an annulus that defines a volume in which a mixture of an oxidizer and a fuel detonate in a rotating fashion, the volume defining a downstream outlet through which detonation exhaust flows. The rotating detonation engine further includes a wave arrestor positioned upstream from a location of detonation and configured to reduce a magnitude of a pressure wave traveling upstream from the location of detonation.

In any of the foregoing embodiments, the wave arrestor is positioned within the volume.

In any of the foregoing embodiments, the wave arrestor is positioned upstream from the volume.

In any of the foregoing embodiments, the wave arrestor includes a plurality of obstacles configured to reflect at least some of the pressure wave downstream.

In any of the foregoing embodiments, the annulus includes an inner cylinder and an outer cylinder that define the volume, and wherein the plurality of obstacles extend from the inner cylinder to the outer cylinder.

In any of the foregoing embodiments, the annulus includes an inner cylinder and an outer cylinder that define the volume, and wherein the plurality of obstacles extend partially from the inner cylinder to the outer cylinder.

In any of the foregoing embodiments, the wave arrestor includes a first main channel through which the pressure wave travels and a first channel splitter configured to split the first main channel into multiple sub-channels such that the pressure wave is split into sub-waves that each propagate through one of the multiple sub-channels.

In any of the foregoing embodiments, the wave arrestor further includes a second main channel and a second channel splitter configured to combine the multiple sub-channels into the second main channel, and wherein the multiple sub-channels each have a different length such that the sub-waves propagate through the second main channel at different times.

In any of the foregoing embodiments, the wave arrestor includes a main channel having a downstream portion and an upstream portion that has a greater cross-sectional area than the downstream portion such that the pressure wave expands in response to reaching the upstream portion, resulting in the magnitude of the pressure wave decreasing.

In any of the foregoing embodiments, the wave arrestor includes a main channel having a textured surface that reduces the magnitude of the pressure wave.

Also disclosed is a rotating detonation engine. The rotating detonation engine includes an oxidizer outlet configured to output an oxidizer. The rotating detonation engine further includes a fuel outlet configured to output a fuel. The rotating detonation engine further includes an annulus that defines a volume in which a mixture of the oxidizer and the fuel detonate in a rotating fashion, the volume defining a downstream outlet through which detonation exhaust flows. The rotating detonation engine further includes a wave arrestor positioned upstream from a location of detonation and configured to reduce a magnitude of a pressure wave traveling upstream from the location of detonation.

In any of the foregoing embodiments, the wave arrestor includes a plurality of obstacles configured to reflect at least some of the pressure wave downstream.

In any of the foregoing embodiments, the annulus includes an inner cylinder and an outer cylinder that define the volume, and wherein the plurality of obstacles extend from the inner cylinder to the outer cylinder.

In any of the foregoing embodiments, the annulus includes an inner cylinder and an outer cylinder that define the volume, and wherein the plurality of obstacles extend partially from the inner cylinder to the outer cylinder.

In any of the foregoing embodiments, the wave arrestor includes a first main channel through which the pressure wave travels and a first channel splitter configured to split the first main channel into multiple sub-channels such that the pressure wave is split into sub-waves that each propagate through one of the multiple sub-channels.

In any of the foregoing embodiments, the wave arrestor further includes a second main channel and a second channel splitter configured to combine the multiple sub-channels into the second main channel, and wherein the multiple sub-channels each have a different length such that the sub-waves propagate through the second main channel at different times.

In any of the foregoing embodiments, the wave arrestor includes a main channel having a downstream portion and an upstream portion that has a greater cross-sectional area than the downstream portion such that the pressure wave expands in response to reaching the upstream portion, resulting in the magnitude of the pressure wave decreasing.

In any of the foregoing embodiments, the wave arrestor includes a main channel having a textured surface that reduces the magnitude of the pressure wave.

Also disclosed is a gas turbine engine. The gas turbine engine includes a turbine section configured to convert detonation exhaust into torque. The gas turbine engine further includes a compressor section configured receive the torque from the turbine section and to utilize the torque to compress fluid. The gas turbine engine further includes a rotating detonation engine configured to generate the detonation exhaust. The rotating detonation engine includes an annulus that defines a volume in which a mixture of an oxidizer and a fuel detonate in a rotating fashion, the volume defining a downstream outlet through which the detonation exhaust flows. The rotating detonation engine further includes a wave arrestor positioned upstream from a location of detonation and configured to reduce a magnitude of a pressure wave traveling upstream from the location of detonation.

In any of the foregoing embodiments, the wave arrestor includes a plurality of obstacles configured to reflect at least some of the pressure wave downstream.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

As used herein, "radially outward" refers to the direction generally away from the axis of rotation of a turbine engine. As used herein, "radially inward" refers to the direction generally towards the axis of rotation of a turbine engine.

Figure 1:
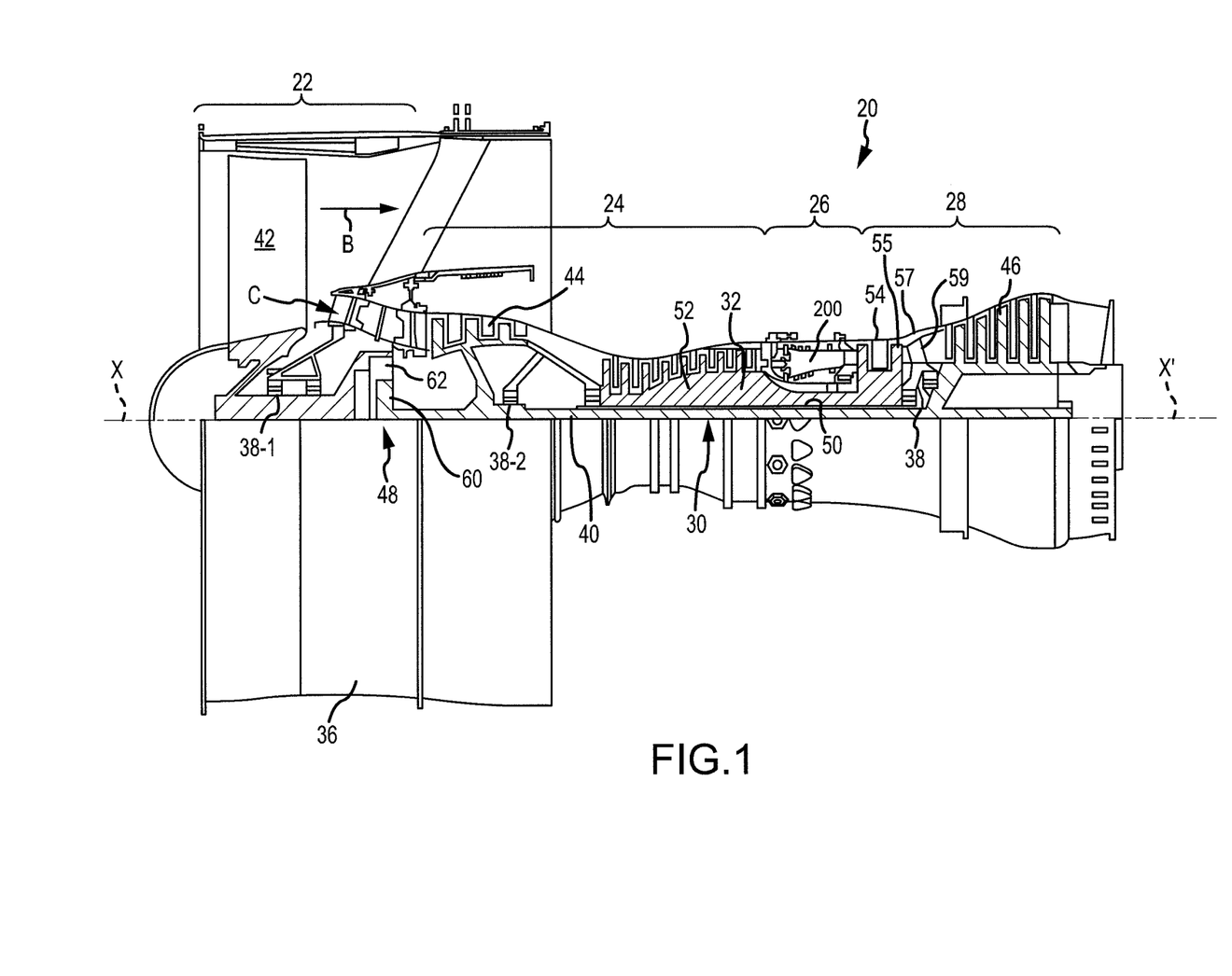
FIG. 1 is a schematic cross-section of a gas turbine engine, in accordance with various embodiments.

In various embodiments and with reference to FIG. 1, a gas turbine engine 20 is provided. The gas turbine engine 20 may be a two-spool turbofan that generally incorporates a fan section 22, a compressor section 24, a combustor section 26 and a turbine section 28. Alternative engines may include, for example, an augmentor section among other systems or features. In operation, the fan section 22 can drive coolant (e.g., air) along a bypass flow path B while the compressor section 24 can drive coolant along a core flow path C for compression and communication into the combustor section 26 then expansion through the turbine section 28. Although depicted as a two-spool turbofan gas turbine engine 20 herein, it should be understood that the concepts described herein are not limited to use with two-spool turbofans as the teachings may be applied to other types of turbine engines including turbojet, turboprop, turboshaft, or power generation turbines, with or without geared fan, geared compressor or three-spool architectures.

The gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 may generally comprise an inner shaft 40 that interconnects a fan 42, a low pressure compressor 44 and a low pressure turbine 46. The inner shaft 40 may be connected to the fan 42 through a geared architecture 48 that can drive the fan 42 at a lower speed than the low speed spool 30. The geared architecture 48 may comprise a gear assembly 60 enclosed within a gear housing 62. The gear assembly 60 couples the inner shaft 40 to a rotating fan structure. The high speed spool 32 may comprise an outer shaft 50 that interconnects a high pressure compressor 52 and high pressure turbine 54. A rotating detonation engine 200 may be located between high pressure compressor 52 and high pressure turbine 54. A mid-turbine frame 57 of the engine static structure 36 may be located generally between the high pressure turbine 54 and the low pressure turbine 46. Mid-turbine frame 57 may support one or more bearing systems 38 in the turbine section 28. The inner shaft 40 and the outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flow path C may be compressed by the low pressure compressor 44 then the high pressure compressor 52, mixed and burned with fuel in the rotating detonation engine 200, then expanded over the high pressure turbine 54 and the low pressure turbine 46. The turbines 46, 54 rotationally drive the respective low speed spool 30 and high speed spool 32 in response to the expansion.

The gas turbine engine 20 may be, for example, a high-bypass ratio geared engine. In various embodiments, the bypass ratio of the gas turbine engine 20 may be greater than about six (6). In various embodiments, the bypass ratio of the gas turbine engine 20 may be greater than ten (10). In various embodiments, the geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

In various embodiments, the low pressure compressor 44, the high pressure compressor 52, the low pressure turbine 46, and the high pressure turbine 54 may comprise one or more stages or sets of rotating blades and one or more stages or sets of stationary vanes axially interspersed with the associated blade stages but non-rotating about engine central longitudinal axis A-A'. The compressor and turbine sections 24, 28 may be referred to as rotor systems. Within the rotor systems of the gas turbine engine 20 are multiple rotor disks, which may include one or more cover plates or minidisks. Minidisks may be configured to receive balancing weights or inserts for balancing the rotor systems.

Figure 2A:
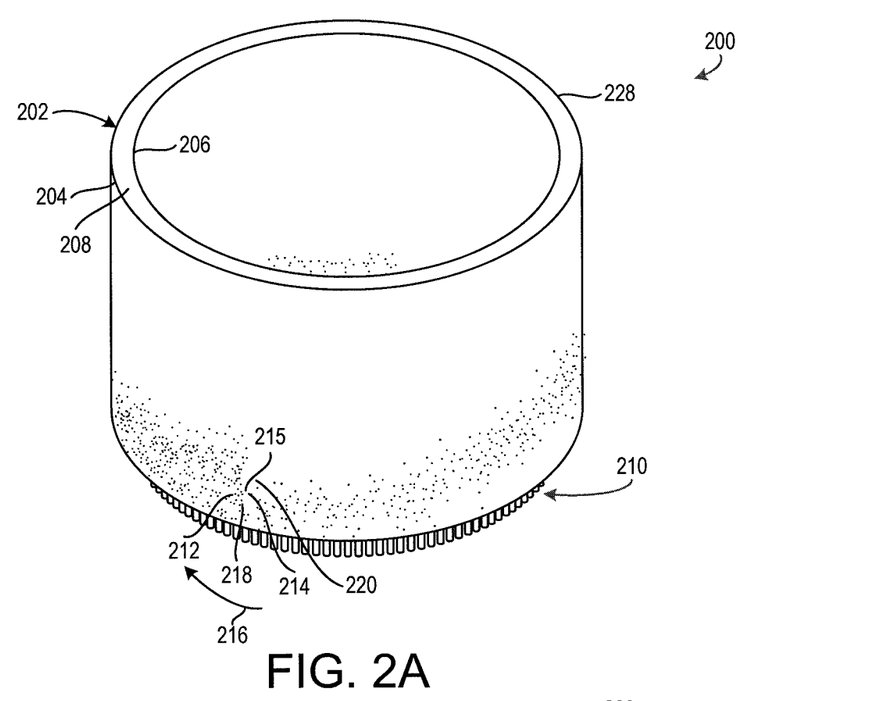
FIGS. 2A, 2B, and 2C are drawings illustrating various features of a rotating detonation engine, in accordance with various embodiments.
Figure 2B:
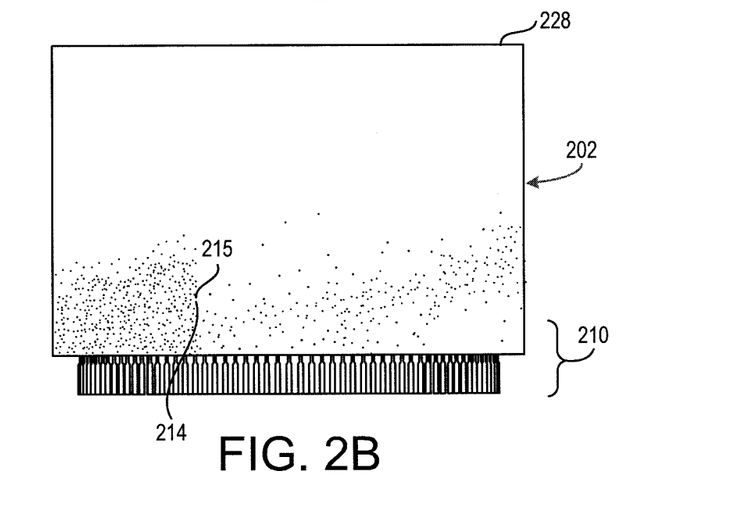
Figure 2C:
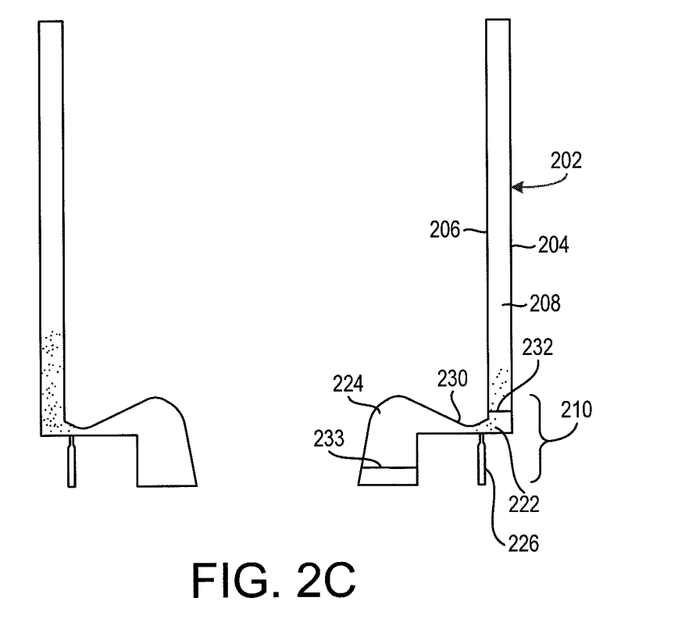

Referring now to FIGS. 2A, 2B, and 2C, the rotating detonation engine 200 may include an annulus 202 including an outer cylinder 204 and an inner cylinder 206. The outer cylinder 204 and the inner cylinder 206 may define a volume 208 therebetween. Although the rotating detonation engine 200 is shown as an annular structure, one skilled in the art will realize that a rotating detonation engine may have any shape that provides a continuous path for detonation to follow. For example, a rotating detonation engine may have an elliptical shape, a trapezoidal shape, or the like. In that regard, where used in this context, "annulus" may refer to any continuous circumferential channel having annular or any other shape such as trapezoidal or elliptical. Furthermore, where used herein, "annular volume" may likewise refer to any continuous circumferential channel having annular or any other shape such as trapezoidal or elliptical.

Furthermore, although the rotating detonation engine 200 is shown in use in a gas turbine engine, one skilled in the art will realize that a rotating detonation engine may be used as a combustor in any other system, such as a ramjet engine, an augmentor section of an engine, or the like.

A fuel mixer 210 may be positioned upstream from the annulus 202 and may provide a fuel mixture 212 including a combustible blend of an oxidizer and a fuel. The fuel mixture 212 may be continuously introduced into the volume 208. The rotating detonation engine 200 may then be initialized, causing a detonation 214 to occur. The detonation 214 corresponds to an ignition or combustion of the fuel mixture 212 at a particular location about a circumference of the annulus 202.

The detonation 214 may then continuously travel around the circumference of the annulus 202. As shown in FIG. 2A, the detonation 214 may occur at a location 215 and may travel in a direction illustrated by an arrow 216. A first location 218 within the volume 208 and preceding the detonation 214 may include a relatively large density of the fuel mixture 212. As the detonation 214 reaches the first location 218, the density of the fuel mixture 212 allows the fuel mixture 212 to detonate.

After the detonation occurs, the fuel mixture 212 may be burned away and the force of the detonation 214 may temporarily resist entry of additional fuel mixture 212 into the volume 208. Accordingly, a second location 220 that has recently detonated may have a relatively low density of the fuel mixture 212. In that regard, the detonation 214 may continue to rotate about the volume 208 in the direction shown by the arrow 216.

The detonation 214 may generate detonation exhaust. The rotating detonation engine 200 may include a downstream outlet 228 through which the detonation exhaust travels prior to reaching the turbine section 28 of FIG. 1. The detonation 214 will generate a pressure wave. It is undesirable for the pressure wave to travel upstream from the location 215 of the detonation 214. In that regard, the rotating detonation engine 200 may include one or more wave arrestor for reducing the magnitude of any pressure wave that may travel upstream from the location 215 of the detonation 214. Where used in this context, upstream refers to a direction towards the compressor section 24 of FIG. 1, and downstream refers to a direction towards the turbine section 28 of FIG. 1.

The fuel mixer 210 may be designed to blend and output the fuel mixture 212. In particular, the fuel mixer 210 may include a combustion channel 222, an oxidizer channel 224, and a fuel outlet 226. The combustion channel 222, the oxidizer channel 224, and the fuel outlet 226 may each include a metal or other material capable of withstanding relatively high temperatures such as one or more of an austenitic nickel-chromium-based alloy such as that sold under the trademark Inconel® which is available from Special Metals Corporation of New Hartford, N.Y., USA, or a stainless steel.

The oxidizer channel 224 may transport an oxidizer. The fuel outlet 226 may output a fuel. The fuel outlet 226 and the oxidizer channel 224 may be positioned upstream from the combustion channel 222.

The oxidizer from the oxidizer channel 224 and the fuel from the fuel outlet 226 may combine in the combustion channel 222 as the final mixture of the fuel and the oxidizer. The final mixture may be capable of detonation within one or both of the combustion channel 222 or the volume 208.

The rotating detonation engine 200 may include one or more wave arrestor for reducing the magnitude of a pressure wave experienced upstream of the detonation as compared to the pressure wave generated by the detonation. In all embodiments, the wave arrestor will be positioned upstream from detonation. For example, the rotating detonation engine 200 may include a wave arrestor 232 that may be positioned in the combustion channel 222. Another example is wave arrestor 233 that may be positioned upstream of the combustion channel 233. The rotating detonation engine may also include multiple wave arrestors including the first wave arrestor 232 and the second wave arrestor 233. In various embodiments, a wave arrestor may be positioned at any location upstream from detonation. Where used in this context, upstream refers to a direction towards the oxidizer supply, and downstream refers to a direction towards an outlet through which combustion gasses exit the rotating detonation engine 200.

Figure 3A:
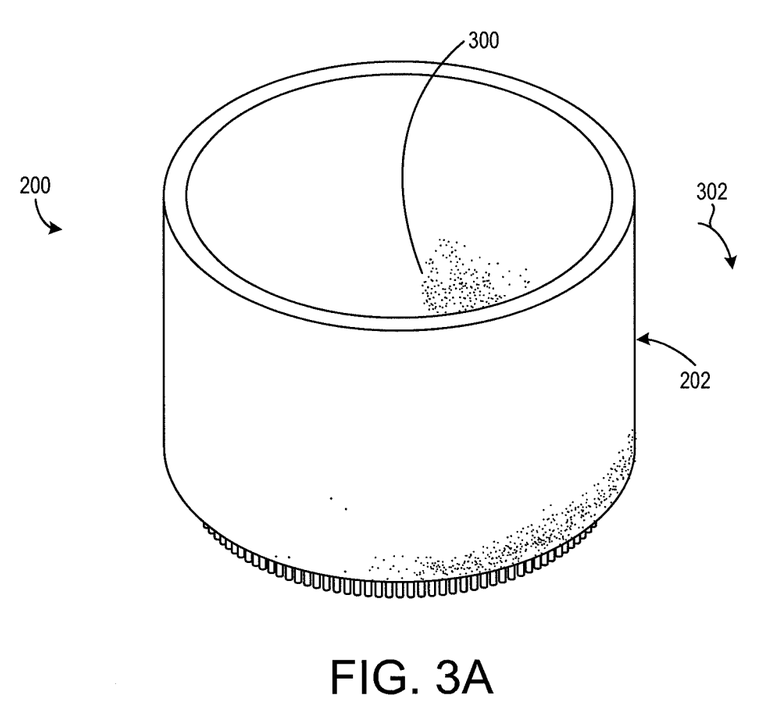
FIGS. 3A, 3B, and 3C are drawings illustrating rotation of the detonation of the rotating detonation engine of FIGS. 2A, 2B, and 2C, in accordance with various embodiments.
Figure 3B:
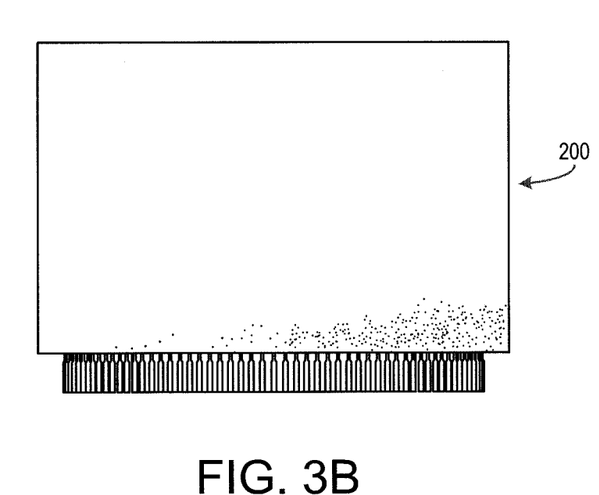
Figure 3C:
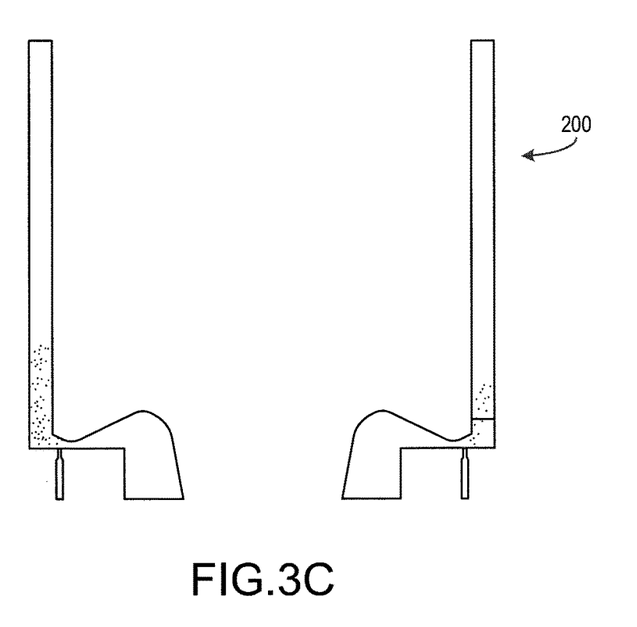

Referring now to FIGS. 3A, 3B, and 3C, the rotating detonation engine 200 is shown at a point in time later than shown in FIGS. 2A, 2B, and 2C. In particular, the rotating detonation engine 200 now has a detonation 300 at a different location than the detonation 214 of FIG. 2. As shown, the detonation 300 continues to travel counterclockwise about the annulus 202 as shown by an arrow 302. In various embodiments, a detonation of a rotating detonation engine may travel clockwise, counterclockwise, or both at the same time without departing from the scope of the present disclosure. In various embodiments, multiple detonation waves of the rotating detonation engine may travel simultaneously in the combustion chamber.

Turning now to FIGS. 4A, 4B, 4C, and 4D, exemplary operation of a wave arrestor 400 for use in a rotating detonation engine (such as the rotating detonation engine 200 of FIGS. 2A, 2B, and 2C) is shown. In particular, FIGS. 4A, 4B, 4C, and 4D illustrate propagation of a pressure wave 406 at various moments in time. The wave arrestor 400 may be located upstream from detonation in a rotating detonation engine such as, for example, in the location of either of the wave arrestor 232 or the wave arrestor 233 of FIG. 2C.

The wave arrestor 400 may be designed to reduce a magnitude of the pressure wave 406 in an upstream direction 404 (i.e., towards a compressor section of a corresponding gas turbine engine) as opposed to a downstream direction 402 (i.e., towards a downstream outlet).

Figures 4A, 4B:
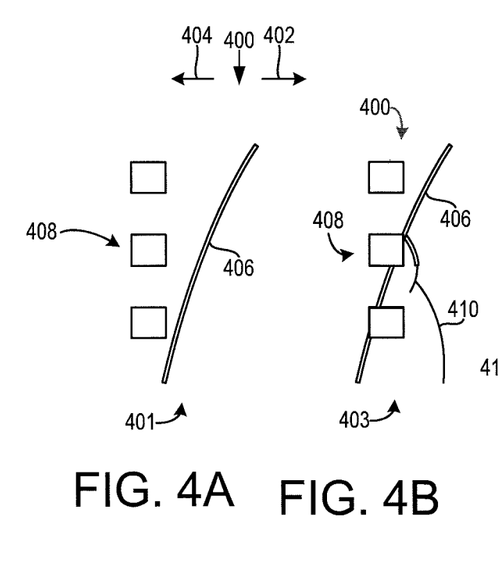
FIGS. 4A, 4B, 4C, and 4D are drawings illustrating effects of a wave arrestor on a wave over a period of time, the wave arrestor having a plurality of obstacles, in accordance with various embodiments.

The wave arrestor 400 includes a plurality of obstacles 408. The plurality of obstacles 408 may be located in the upstream direction 404 relative to the location of detonation. The plurality of obstacles 408 may be designed to reflect a portion of the upstream wave downstream or result in a local increase of cross-sectional area experienced by the remaining upstream propagating pressure wave 406 as it propagates upstream of the obstacles. For example, by splitting and reflecting portions of the pressure wave 406. As shown in FIG. 4A, the pressure wave 406 has not yet reached the plurality of obstacles 408 at a first point in time 401. However, at a second point in time 403, the pressure wave 406 has reached a portion of the plurality of obstacles 408. The pressure wave 406 is split by the portion of the plurality of obstacles 408 that the pressure wave 406 has reached, generating a reflection 410 of the pressure wave 406.

Figures 4C, 4D:
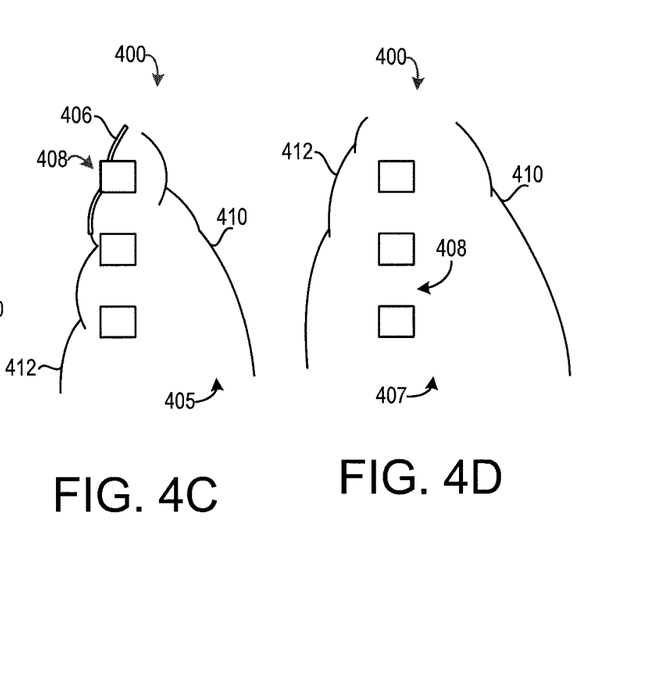

At a later point in time 405, the pressure wave 406 has reached all the plurality of obstacles 408. In that regard, a reflection 410 of the pressure wave 406 has been created by each of the plurality of obstacles 408. The portion of the pressure wave 406 that continued to propagate upstream is weakened by the increase of cross sectional area as the wave leaves the plurality of obstacles 408. At an even later point in time 407, the pressure wave 406 has passed by each of the plurality of obstacles 408. Accordingly, a weakened pressure wave 412 is formed due to the increased cross-sectional area of the weakened pressure wave 412. Accordingly, the weakened pressure wave 412 has a lower magnitude than the original pressure wave 406.

Figure 4E:
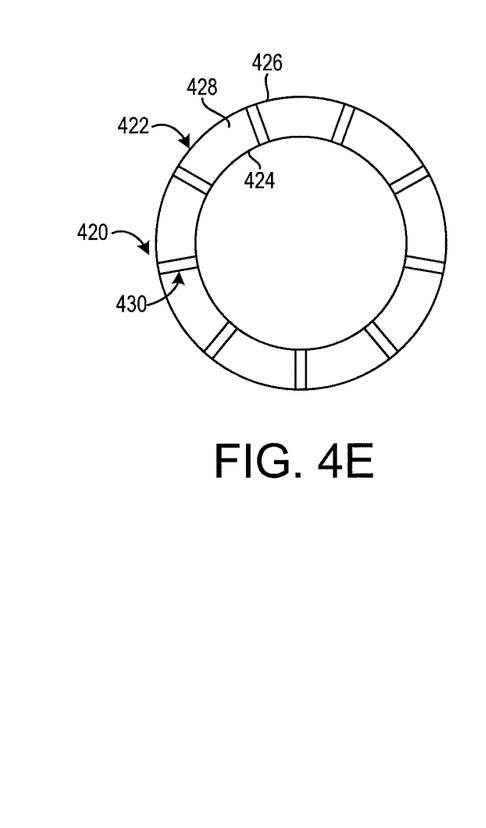
FIG. 4E is a drawing of a wave arrestor having a plurality of obstacles, in accordance with various embodiments.

Turning now to FIG. 4E, a wave arrestor 420 having a plurality of obstacles 430 is shown. The wave arrestor 420 may be positioned within an annulus 422 of a rotating detonation engine. In that regard, the annulus 422 may include an inner cylinder 424 and an outer cylinder 426 that define a volume 428 therebetween. In the wave arrestor 420, each of the plurality of obstacles 430 may extend from the inner cylinder 424 to the outer cylinder 426. In various embodiments, the wave arrestor 420 may be positioned within another volume, such as a mixture channel or an oxidizer channel that is located upstream from an annulus of a rotating detonation engine, without departing from the scope of the present disclosure.

Figure 4F:
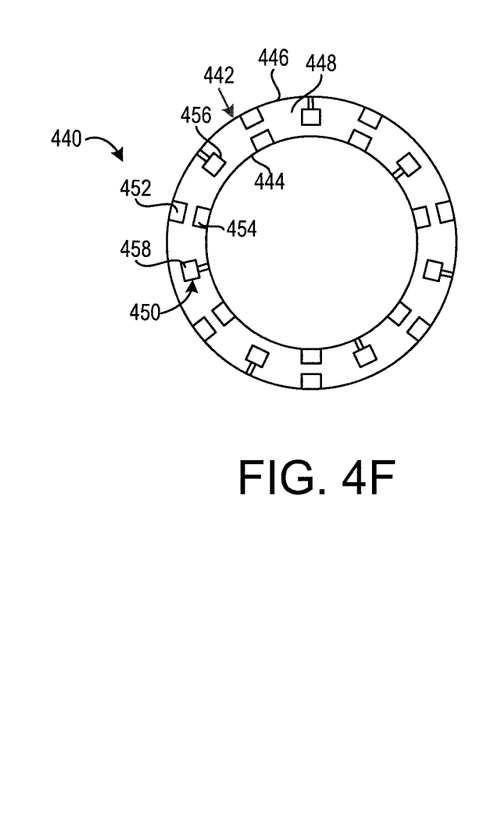
FIG. 4F is a drawing of another wave arrestor having a plurality of obstacles, in accordance with various embodiments.

Turning now to FIG. 4F, another wave arrestor 440 having a plurality of obstacles 450 is shown. The wave arrestor 440 may be positioned within an annulus 442 of a rotating detonation engine. In that regard, the annulus 422 may include an inner cylinder 444 and an outer cylinder 446 that define a volume 448 therebetween. In the wave arrestor 440, each of the plurality of obstacles 450 may extend from one of the inner cylinder 444 or the outer cylinder 446 and may extend partially across the volume 448.

In particular, the plurality of obstacles 450 may include a plurality of obstacles 452 that extend partially across the volume 448 from the outer cylinder 446. The plurality of obstacles 450 may further include a plurality of obstacles 454 that extend partially across the volume 448 from the inner cylinder 444. The plurality of obstacles 450 may further include a plurality of obstacles 456 that extend partially across the volume 448 from the inner cylinder 444 for a distance that is greater than the plurality of obstacles 452. The plurality of obstacles 450 may further include a plurality of obstacles 458 that extend partially across the volume 448 from the outer cylinder 4464 a distance that is greater than the plurality of obstacles 454.

Figure 5:
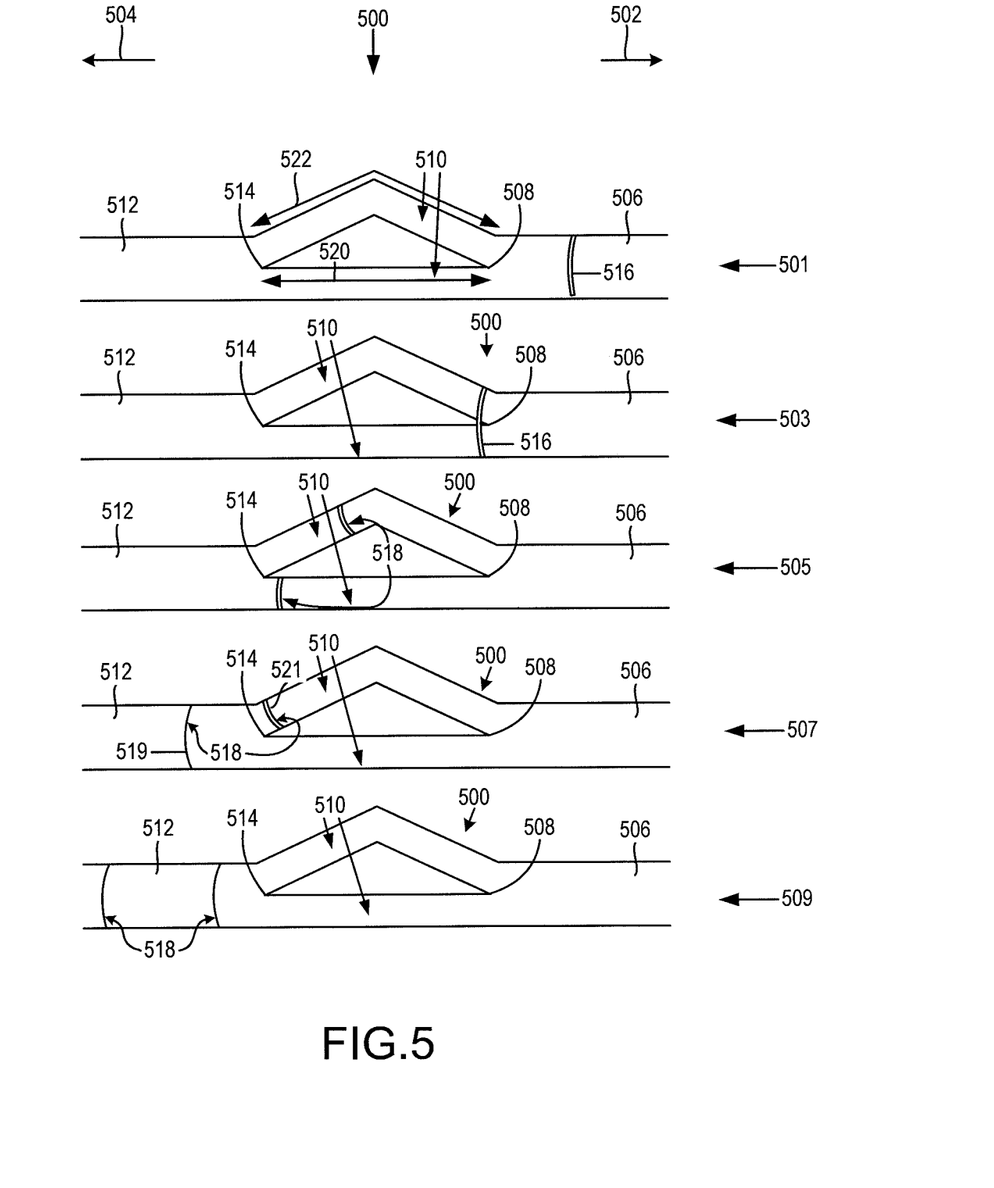
FIG. 5 is a drawing illustrating effects of a wave arrestor on a wave over a period of time, the wave arrestor having multiple subchannels, in accordance with various embodiments.

Turning now to FIG. 5, another wave arrestor 500 is shown. The wave arrestor 500 may be located in an upstream direction 504 relative to a location of detonation of a rotating detonation engine. A pressure wave 516 may propagate towards the wave arrestor 500 from a downstream direction 502. FIG. 5 illustrates the propagation of the pressure wave 516 at various times.

The wave arrestor 500 may include a first main channel 506. The pressure wave 516 may propagate through the first main channel 506 at a first time 501. The wave arrestor 500 may further include a first channel splitter 508 that splits the main channel 506 into multiple sub-channels 510. As shown in FIG. 5, the first channel splitter 508 splits the main channel 506 into two sub-channels 510. In various embodiments, a channel splitter may split a main channel into any quantity of sub-channels without departing from the scope of the present disclosure.

At a later point in time 503, the pressure wave 516 may reach the first channel splitter 508. In that regard, the first channel splitter 508 may split the pressure wave 516 into multiple sub-waves. At a later point in time 505, the multiple sub-waves 518 may each propagate through one of the sub-channels 510.

One of the sub-channels 510 has a first length 520, and another of the sub-channels 510 has a second length 522. In various embodiments, the first length 520 may be different than the second length 522 such that the each of sub-waves 518 exits the corresponding sub-channel 510 at a different time.

The wave arrestor 500 further includes a second channel splitter 514 that is designed to combine multiple sub-channels 510 into a second main channel 512. At a later point in time 507, a first sub-wave 519 has exited its sub-channel 510 into the second main channel 512 while a second sub-wave 521 still remains within its sub-channel 510.

At a later point in time 509, both of the sub-waves 518 have exited the sub-channels 510 into the second main channel 512. Because each of the sub-waves 518 entered the second main channel 512 at a different time, each of the sub-waves 518 remains separate. As each sub-wave 518 enters the second main channel, its corresponding cross-sectional area is increased. Such an increase reduces the magnitude of each sub-wave 518. Thus, by splitting the pressure wave 516 into multiple sub-waves that travel upstream and enter the second main channel 512 at different times, upstream components may be exposed to a force that is less than that of the original pressure wave 516.

Figure 6:
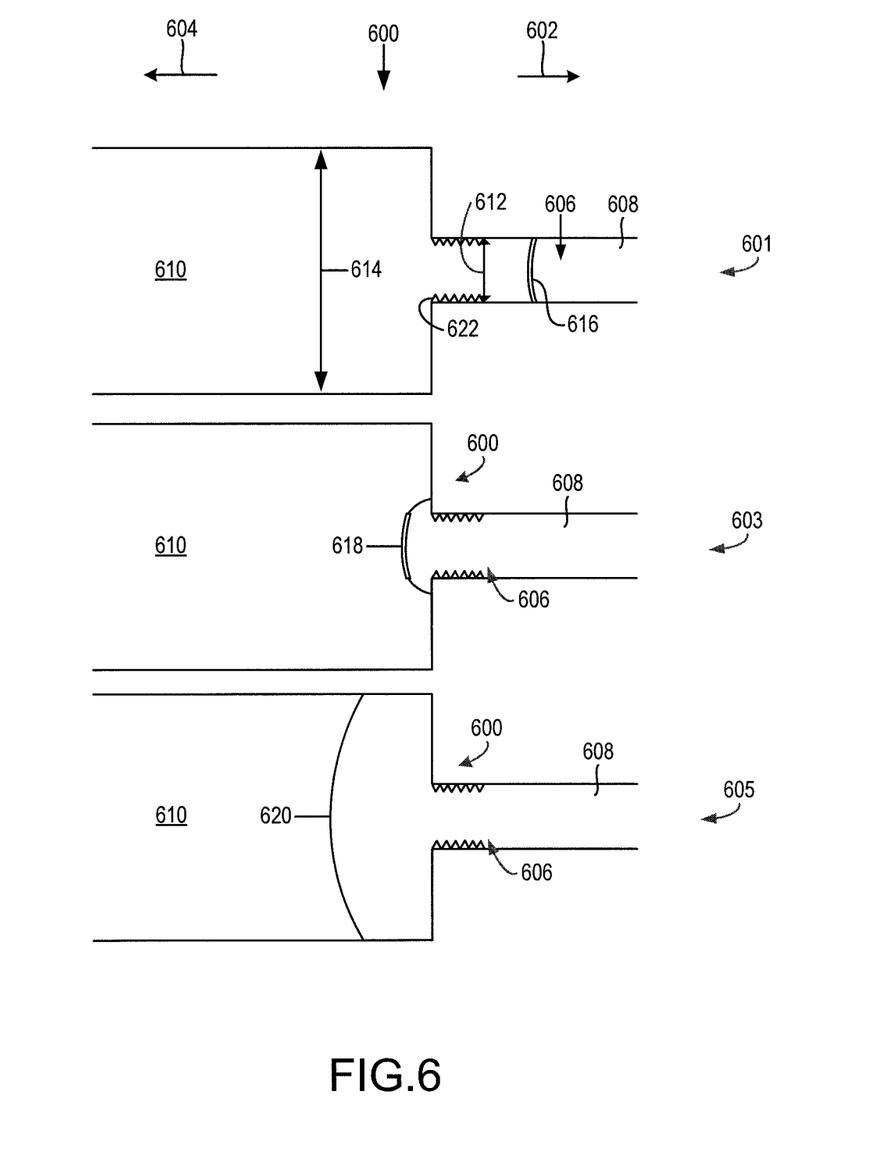
FIG. 6 is a drawing illustrating effects of a wave arrestor on a wave over a period of time, the wave arrestor having a main channel with an upstream portion and a downstream portion, in accordance with various embodiments.

Turning now to FIG. 6, another wave arrestor 600 is shown. The wave arrestor 600 may be located in an upstream direction 604 relative to a location of detonation of a rotating detonation engine. A pressure wave 616 may propagate towards the wave arrestor 600 from a downstream direction 602. FIG. 6 illustrates the propagation of the pressure wave 616 at various times.

The wave arrestor 600 may have a main channel 606 having an downstream portion 608 and a upstream portion 610. The downstream portion 608 may have a first cross-sectional area 612, and the upstream portion 610 may have a second cross-sectional area 614. The second cross-sectional area 614 may be greater than the first cross-sectional area 612.

At a first point in time 601, the pressure wave 616 may travel in the upstream direction 604. At a later time 603, the pressure wave 616 may have entered into the upstream portion 610 and into a partially expanded pressure wave 618. At a later time 605, the pressure wave has entered the upstream portion 610 and expanded to the full diameter 614 of the upstream portion 610. In that regard, the pressure wave has been converted into a fully expanded pressure wave 620. Due to the increase of the cross-sectional area of the pressure wave 620 in the upstream portion 610, a magnitude of the pressure wave 620 is less than a magnitude of the original pressure wave 616.

The main channel 606 may further include a textured surface 622. The textured surface 622 may be positioned at any location along the main channel 606. The textured surface 622 may function in a similar manner as the plurality of obstacles 450 of FIG. 4F. In particular, the textured surface 622 may include a plurality of relatively small obstacles over which a pressure wave must pass. The obstacles may re-route and/or reflect some of the pressure wave, thus increasing a cross-sectional area of the wave and decreasing a magnitude of the wave. In that regard, the textured surface 622 may function in a similar manner as the plurality of obstacles 450 of FIG. 4F.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rotating detonation engine, comprising:
   an annulus that defines a volume in which a mixture of an oxidizer and a fuel detonate in a rotating fashion in which a detonation travels clockwise or counterclockwise along a circumference of the annulus, the volume defining a downstream outlet through which detonation exhaust flows; and
   a wave arrestor positioned upstream from a location of detonation and configured to reduce a magnitude of a pressure wave traveling upstream from the location of detonation.

2. The rotating detonation engine of claim 1, wherein the wave arrestor is positioned within the volume.

3. The rotating detonation engine of claim 1, wherein the wave arrestor is positioned upstream from the volume.

4. The rotating detonation engine of claim 1, wherein the wave arrestor includes a plurality of obstacles configured to reflect at least some of the pressure wave downstream.

5. The rotating detonation engine of claim 4, wherein the annulus includes an inner cylinder and an outer cylinder that define the volume, and wherein the plurality of obstacles extend from the inner cylinder to the outer cylinder.

6. The rotating detonation engine of claim 4, wherein the annulus includes an inner cylinder and an outer cylinder that define the volume, and wherein the plurality of obstacles extend partially from the inner cylinder to the outer cylinder.

7. The rotating detonation engine of claim 1, wherein the wave arrestor includes a first main channel through which the pressure wave travels and a first channel splitter configured to split the first main channel into multiple sub-channels such that the pressure wave is split into sub-waves that each propagate through one of the multiple sub-channels.

8. The rotating detonation engine of claim 7, wherein the wave arrestor further includes a second main channel and a second channel splitter configured to combine the multiple sub-channels into the second main channel, and wherein the multiple sub-channels each have a different length such that the sub-waves propagate through the second main channel at different times.

9. The rotating detonation engine of claim 1, wherein the wave arrestor includes a main channel having a downstream portion and an upstream portion that has a greater cross-sectional area than the downstream portion such that the pressure wave expands in response to reaching the upstream portion, resulting in the magnitude of the pressure wave decreasing.

10. The rotating detonation engine of claim 1, wherein the wave arrestor includes a main channel having a textured surface that reduces the magnitude of the pressure wave.

11. A rotating detonation engine, comprising:
    an oxidizer outlet configured to output an oxidizer;
    a fuel outlet configured to output a fuel;
    an annulus that defines a volume in which a mixture of the oxidizer and the fuel detonate in a rotating fashion in which a detonation travels clockwise or counterclockwise along a circumference of the annulus, the volume defining a downstream outlet through which detonation exhaust flows; and
    a wave arrestor positioned upstream from a location of detonation and configured to reduce a magnitude of a pressure wave traveling upstream from the location of detonation.

12. The rotating detonation engine of claim 11, wherein the wave arrestor includes a plurality of obstacles configured to reflect at least some of the pressure wave downstream.

13. The rotating detonation engine of claim 12, wherein the annulus includes an inner cylinder and an outer cylinder that define the volume, and wherein the plurality of obstacles extend from the inner cylinder to the outer cylinder.

14. The rotating detonation engine of claim 12, wherein the annulus includes an inner cylinder and an outer cylinder that define the volume, and wherein the plurality of obstacles extend partially from the inner cylinder to the outer cylinder.

15. The rotating detonation engine of claim 11, wherein the wave arrestor includes a first main channel through which the pressure wave travels and a first channel splitter configured to split the first main channel into multiple sub-channels such that the pressure wave is split into sub-waves that each propagate through one of the multiple sub-channels.

16. The rotating detonation engine of claim 15, wherein the wave arrestor further includes a second main channel and a second channel splitter configured to combine the multiple sub-channels into the second main channel, and wherein the multiple sub-channels each have a different length such that the sub-waves propagate through the second main channel at different times.

17. The rotating detonation engine of claim 11, wherein the wave arrestor includes a main channel having a downstream portion and an upstream portion that has a greater cross-sectional area than the downstream portion such that the pressure wave expands in response to reaching the upstream portion, resulting in the magnitude of the pressure wave decreasing.

18. The rotating detonation engine of claim 11, wherein the wave arrestor includes a main channel having a textured surface that reduces the magnitude of the pressure wave.

19. A gas turbine engine, comprising:
    a turbine section configured to convert detonation exhaust into torque;
    a compressor section configured receive the torque from the turbine section and to utilize the torque to compress fluid; and
    a rotating detonation engine configured to generate the detonation exhaust and having:
       an annulus that defines a volume in which a mixture of an oxidizer and a fuel detonate in a rotating fashion in which a detonation travels clockwise or counterclockwise along a circumference of the annulus, the volume defining a downstream outlet through which the detonation exhaust flows, and
       a wave arrestor positioned upstream from a location of detonation and configured to reduce a magnitude of a pressure wave traveling upstream from the location of detonation.

20. The gas turbine engine of claim 19, wherein the wave arrestor includes a plurality of obstacles configured to reflect at least some of the pressure wave downstream.

* * * * *